Figure 6:
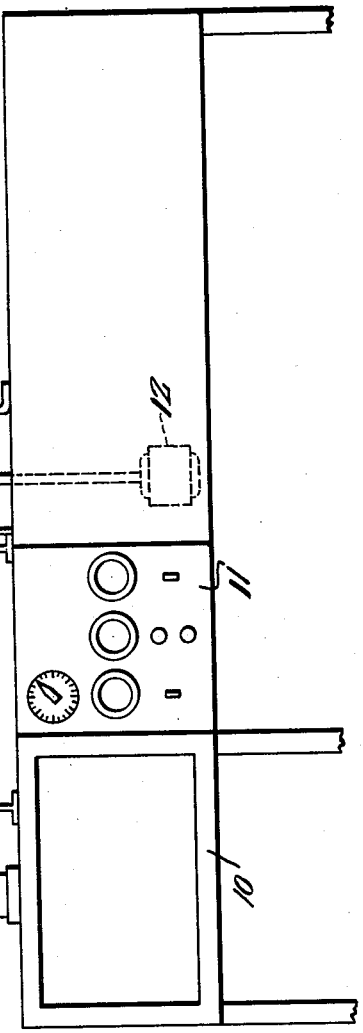

March 5, 1940.  L. T. SACHTLEBEN  2,192,580
BOTTLE INSPECTING DEVICE
Filed March 31, 1937  3 Sheets-Sheet 1
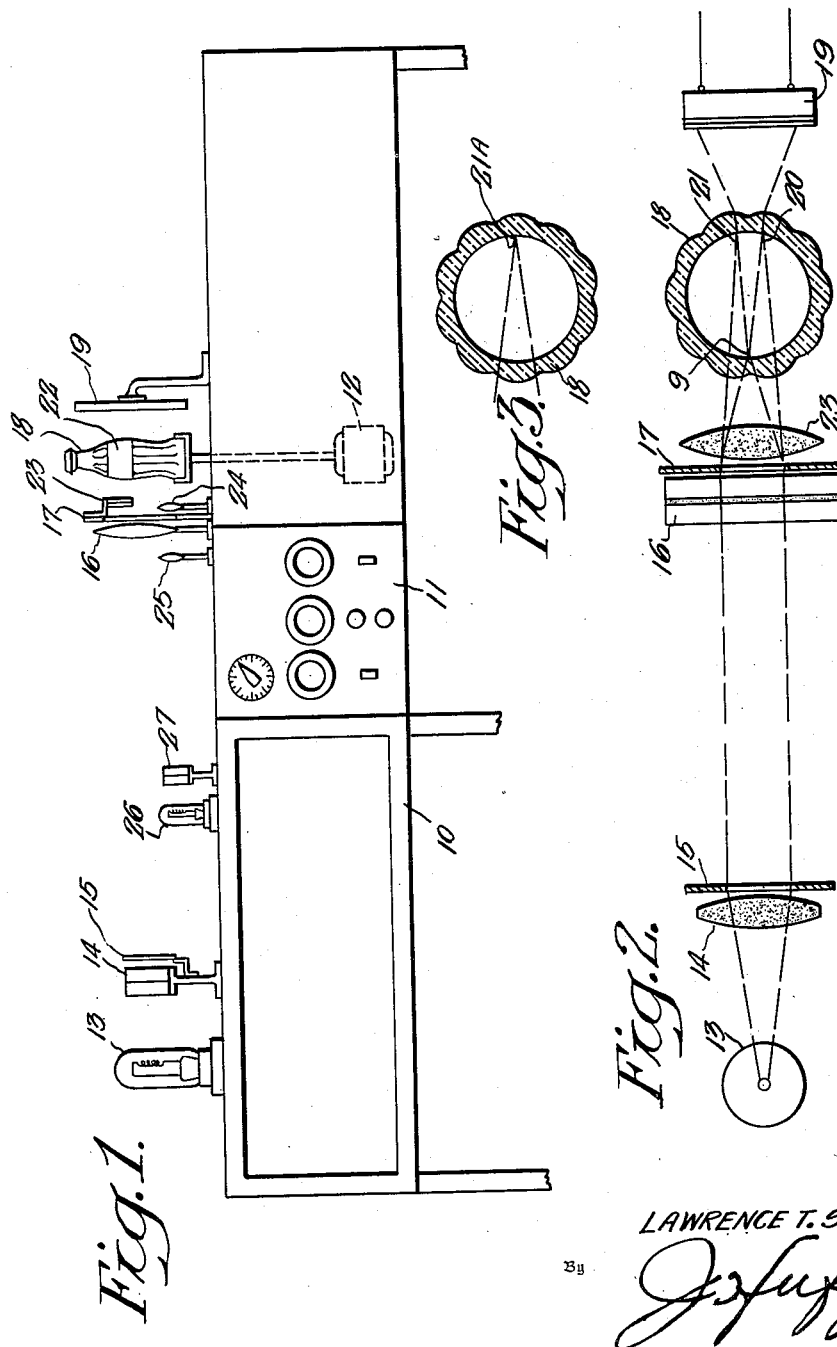
Inventor
LAWRENCE T. SACHTLEBEN
By
Attorney March 5, 1940.                L. T. SACHTLEBEN                2,192,580
                            BOTTLE INSPECTING DEVICE
                    Filed March 31, 1937        3 Sheets-Sheet 2
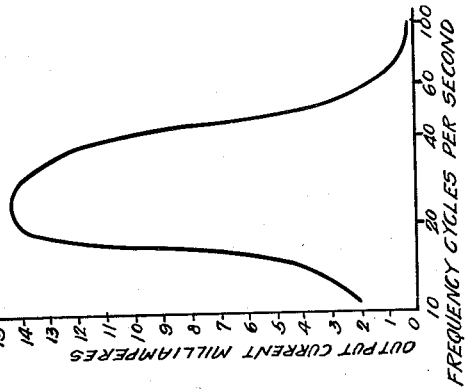
Fig. 5.
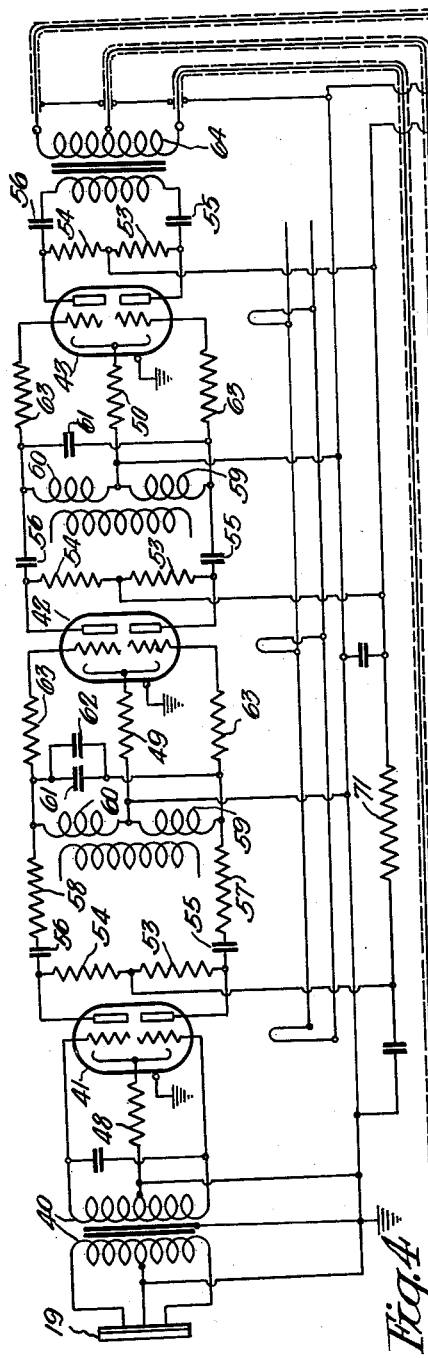
Fig. 4.
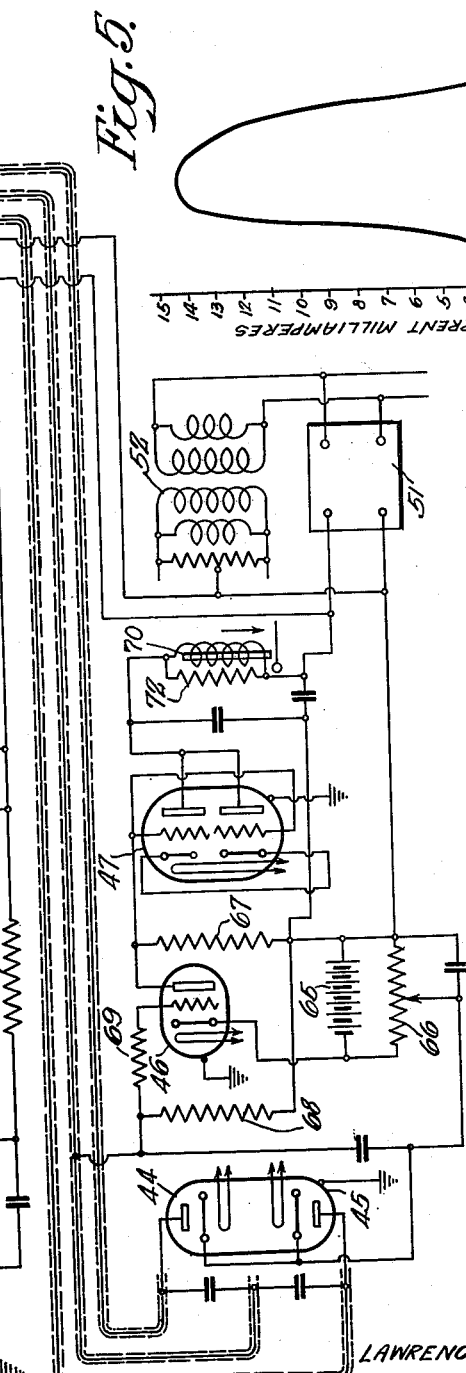
Inventor
LAWRENCE T. SACHTLEBEN
By
Attorney March 5, 1940.                L. T. SACHTLEBEN                2,192,580
                           BOTTLE INSPECTING DEVICE
                           Filed March 31, 1937            3 Sheets-Sheet 3

Inventor
LAWRENCE T. SACHTLEBEN
By
Attorney

Patented Mar. 5, 1940

2,192,580

UNITED STATES PATENT OFFICE 2,192,580

BOTTLE INSPECTING DEVICE

Lawrence T. Sachtleben, Camden, N. J., assignor to Radio Corporation of America, a corporation of Delaware Application March 31, 1937, Serial No. 133,992

7 Claims. (Cl. 88—14)

This invention relates to an apparatus for inspecting the contents of bottles to ascertain whether any foreign particles are present therein and pertains more particularly to the optical system for use in such inspecting devices. The optical system is particularly adapted for the inspection of fluted bottles, such as are used for some types of carbonated beverages, although it is also capable of use in conjunction with plain bottles.

It has heretofore been proposed to pass bottles between a light source and a photocell to determine whether they were properly filled, the greater quantity of light being passed if the bottle was not filled, and the photocell giving a corresponding indication or alarm.

It has been more recently proposed to inspect fluted bottles in a similar manner, but a difficulty was present in that if a fluted bottle was passed between a light source and photocell or rotated between them, the flutes in the bottle would produce a greater variation in the light than any foreign substances it might be desired to detect. This difficulty was avoided by rotating the bottle until the contents were rotated at a fairly high speed, i. e., around 20 or 30 revolutions per second and then suddenly stopping the bottle, whereupon the light was transmitted for the purpose of inspection. It will be apparent that by this method any flaws in the bottle or irregularities in the bottle surface would remain stationary, not materially affecting the photocell, while any foreign particles in the rotating contents would periodically affect the transmitted light at a speed corresponding to the speed of rotation of the contents. In the practical application of such a device, however, considerable difficulty was encountered due to the peculiar optical properties of the bottle which rendered it extremely difficult to locate small particles of transparent foreign matter. The apparatus of my invention avoids this latter difficulty.

In accordance with my invention, I use the flutings on the bottle as a portion of the optical system and through the use of proper lenses in conjunction therewith, I focus the light from the source into a narrow line adjacent the interior surface of the bottle where foreign materials tend to be thrown by centrifugal force and any foreign particles interrupting this fine line of light produce a correspondingly great effect upon the photocell.

One object of my invention is to provide an optical system for the inspection of the contents of fluted bottles.

Another object of my invention is to provide an optical system for the inspection of the contents of bottles having a portion thereof fluted and another portion unfluted.

Another object of my invention is to provide an optical system which will focus a fine line of light within the bottle and adjacent to the interior surface thereof.

Another object of my invention is to provide an optical system which will provide a greater brilliancy of illumination near the bottom of the bottle where foreign particles are most likely to be found.

Other and incidental objects of my invention will be apparent to those skilled in the art from a reading of the following specification and an inspection of the accompanying drawings in which Figure 1 is a side elevation of the apparatus, Figure 2 is a longitudinal section of the optical system taken along the optical axis thereof and showing a fluted bottle in one position in the apparatus, Figure 3 shows a fluted bottle in a second position in the apparatus, Figure 4 is a schematic diagram of the amplifier incorporated in the apparatus, and Figure 5 is a characteristic curve of the amplifier.

Figure 7:
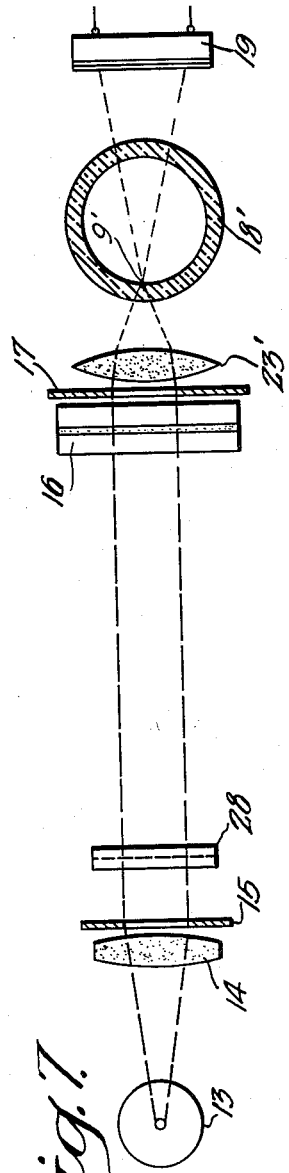

Figure 6 is a side elevation of a modified form of the apparatus. Figure 7 is a longitudinal section of the modified form of the apparatus.

Referring to Fig. 1, an appropriate bench or equivalent support is provided, as indicated at 10, upon which the apparatus is arranged. This bench is provided with an appropriate power control panel 11 and houses a motor 12 for rotating the bottle to be inspected. A lamp 13 is provided which has a single coil filament arranged vertically. Light from this coil filament diverges in the normal manner to the lens 14, which is a double convex cylindrical lens with its axis vertical. This lens permits the light to continue to diverge in a vertical plane but renders it parallel in the horizontal plane, as shown in Fig. 2. A diaphragm 15 restricts this beam to a width corresponding approximately to the width of one of the flutings on the bottle to be inspected. The light passes from this diaphragm 15, as shown in Fig. 2, to the cylindrical lens 16 which has its axis horizontal and which renders the light substantially parallel in the vertical plane. Light passing through the lens 16 passes through a second diaphragm 17, which serves to stop any stray light and to mask off the vortex at the surface of the liquid, and which corresponds in width to the diaphragm 15, and thence to the bottle 18, which is undergoing inspection. Light passing through this bottle 18 goes to the photocell 19, which it affects in a manner to be described later. This photocell 19 is shown, in the present instance, as of a type which is generally referred to as a barrier type photocell and may be made up of a number of small units, although either the vacuum or gas type of phototube may be used, if desired. The light passing through the diaphragm 17 strikes the flutes on the bottle 18 and if the bottle happens to be in the position shown in Fig. 2, where portions of two flutes fall within the beam, the light is collected to two line-foci 20 and 21 within the bottle. If, on the other hand, the bottle is so located that only one flute happens to be in the path of the beam, the light is directed to a single line focus, as indicated at 21A in Fig. 3. In either case, however, any small particle passing the light focus will sufficiently affect the photocell to give a positive indication of any foreign material. The apparatus, as built, is so sensitive that in a bottle filled with relatively dark colored fluid, such as the carbonated beverage known commercially as Coca-Cola, a particle of glass about one-thirty-second of an inch in size gives reliable indication and larger objects, such as a fragment of a transparent "straw", give a correspondingly greater indication. Any opaque object, of course, such as a cigarette butt, is even more readily detected.

As shown in Fig. 1, the bottles may have an unfluted belt, as indicated, for example, at 22 and it is necessary to focus the light beam within this region at the same relative point as it is focused by the flutes on the bottle, and I accordingly provide a cylindrical lens 23 having its axis vertical and of such focal length as to focus the light in this region to the point 9 in Fig. 2. The liquid-filled bottle itself then acts to condense the light on the photocell.

It is often desirable to provide a greater intensity of light at the bottom of the bottle, as solid particles have a tendency to collect there. In order to do this, I may provide one or more auxiliary lenses 24, 25 to direct light from the lamp 13 to this portion of the bottle. These lenses, in such case, are cylindrical lenses with their axes horizontal and if desired a single lens of proper focal length may be used instead of the two lenses. However, the use of these auxiliary lenses, although directing more light through the bottom portion of the bottle, detract somewhat from the amount of light transmitted through the middle portions. In order to avoid this, I may mount the lenses 24, 25 in a position which, as shown, is quite low in relation to the lens 16, and I can then direct light from an auxiliary lamp 26 through a cylindrical lens 27 having its axis vertical, like the lens 14, into the lenses 24 and 25 and thereby secure considerably increased illumination in the lower portion of the bottle without detracting from the general illumination at any other point.

If the apparatus is to be used for the inspection of unfluted bottles 18', as shown in Figures 6 and 7, I substitute for the lens 23 a lens 23' of similar focal length, but of such length as to cover the entire bottle and to thereby focus the beam of light into a line 9' such as indicated at 9 in Fig. 2.

If I so desire, I can shorten the apparatus considerably by the addition of a concave cylindrical lens 28 having its axis horizontal and placed adjacent to the diaphragm 15. This lens will cause a greater vertical divergence of the beam of light so that the entire assembly 13, 14, 15, 28 can be placed much closer to the bottle 18. However, if this is done, it is necessary to correspondingly shorten the focal length of the lens 16 in order to compensate for the increased divergence of the beam and to render the light substantially parallel in the vertical plane as it passes toward the bottle.

The apparatus above described requires a special amplifier to be used between the photocell and the indicating or control apparatus in order to make the best use of the optical efficiency of the device, and this amplifier, which is described and claimed in the concurrently filed application of Paul Weathers, Serial No. 133,998, filed March 31, 1937, and is shown schematically in Figure 4, will be next described:

The photocell 19, as shown in this figure, is divided into two equal parts, and by a vertical adjustment the current output through these parts may be made equal in accordance with the distribution of illumination in the type of bottles to be tested. By the use of a pushpull arrangement of the two parts of the photocell, it is possible to compensate for any variation in brightness of the lamp 13 as any such variation in brightness, whether continued or intermittent, would affect both photoelectric elements similarly and would therefore produce no effect. Any foreign material in the bottle, however, would necessarily affect the two photocell elements differently, as any such material would have a tendency to stay toward the bottom of the bottle. The output from the photocell 19 is fed to a transformer 40 which in turn feeds it to the grids of a vacuum tube 41. This tube 41 and also the tubes 42, 43 and 47 are of the type known as 6N7 and the characteristics of which are given on pages 92 and 93 of the RCA Receiving Tube Manual, No. RC 13, published 1937 by the RCA Manufacturing Company, Inc. Appropriate grid bias for the tube 41 is obtained by the cathode resistor 48 which preferably has a value of 1000 ohms, as likewise have the resistors 49 and 50 which serve to provide bias for the tubes 42 and 43. An appropriate plate supply for the several tubes is indicated at 51, which unit may be any convenient type of either battery or rectifier filter arrangement and which provides a potential of about 200 volts for the plates of the tubes. The heaters of the tube are heated by an appropriate transformer 52, the heating elements themselves and the connections thereof being, as is customary, not shown. The plate current is fed to the tube 41 through the resistors 53 and 54 which are connected in series with the 22,000 ohm resistor 71. The blocking condensers 55 and 56 prevent the power supply source 51 from affecting the grids of the tube 42. An appropriate filter circuit is provided by the resistances 57 and 58 which may be of the order of 20,000 ohms, the inductances 59 and 60 which may have an inductance of the order of 600 henries each and which may, for the sake of convenience, consist of the secondaries of a pushpull transformer having its primary winding left open as shown, and the condensers 61 and 62. The resistors 53 and 54 may have a resistance of the order of 47,000 ohms. This particular arrangement of resistances and inductances has a tendency to transmit a peak frequency of about 25 cycles per second and to transmit a band lying between about 17 and 40 cycles a second, with a sharp cup off at the latter frequencies, as shown in Figure 5. The succeeding tube 43 is connected to the tube 42 through a similar filter system, the elements having corresponding values being similarly numbered. The grid leaks 63 of both the tubes 42 and 43 have a resistance of approximately 390,000 ohms. Due to the construction just described, this portion of the amplifier has a definite frequency characteristic such as shown in Figure 5. In addition to this, the bias produced by the 1000 ohm resistors 49 and 50 maintains the tubes at a point of high sensitivity while at the same time the resistance of the grid leaks 63 is so high that on an extremely strong signal the grids go positive and there is no excessive signal output from the tube 43. From the tube 43 to which plate current is fed in the same manner as the tubes 41 and 42 and which is provided with similar blocking condensers 55 and 56 the current is passed through a transformer 64 to the rectifiers 44 and 45. A 22½ volt battery 65 is provided, across which is located a potentiometer 66, which maintains a potential on the rectifiers 44 and 45 of approximately three volts in a direction opposite to that in which the current tends to pass through the said rectifiers. These two rectifiers may be enclosed within a single casing and may be of the type known commercially as the 6H6, described on page 82 of the aforesaid Receiving Tube Manual above referred to. The tube 47 has its plates connected in parallel and has its grids connected in parallel and normally passes no plate current due to the fact that the voltage drop across the 690,000 ohm resistor 67 of the plate current from the battery 65 to the tube 46 is sufficient to bias this tube to cut-off. However, when a signal slightly in excess of three volts reaches the rectifiers 44 and 45, this excess voltage is applied across the resistor 68 and applies a biasing voltage through the one megohm grid resistor 69 to the tube 46. This potential applied to the grid of the tube 46 causes it to stop passing current, thereby lowering grid bias on the tube 47 and causing the tube 47 to pass sufficient current to actuate the relay 70 across which is shunted a 50,000 ohm protective resistor 72. This relay, in turn, actuates a power relay which serves to control the indicating or bottle ejecting mechanism. The sensitivity of the circuit is such that a variation of as much as 1/100 of a volt above the amount for which the potentiometer 66 is adjusted will cause the tube 46 to pass current, while there is considerably more voltage than this amount available when any foreign material occurs in the bottle being inspected. On the other hand, as pointed out above, excessively strong signals are prevented from reaching the tube 47 due to the limiting action of the grid resistors 63. The device, accordingly, has not only a very high sensitivity but is highly reliable.

Having now described my invention, I claim:

1. In combination with means for causing the contents of a transparent container to rotate while the said container is maintained stationary, means for focusing a narrow line of light parallel to and adjacent the inner surface of the container and parallel to the axis of rotation and photoelectric light-responsive means located to receive the light beam emerging from said narrow line for detecting foreign materials in the said container.

2. Apparatus for examining the rotating contents of a transparent container which is substantially a figure of revolution comprising a light source having a filament with its axis parallel to the intended position of the axis of said figure of revolution, means for directing light in the form of a substantially parallel beam to the said container, means for focusing said beam of light in the form of a narrow line parallel to and adjacent the inner surface of said container and photoelectric light-sensitive means located to pick up the light beam emerging from said container.

3. Apparatus of the class described comprising means for holding a container in a predetermined position, a lamp provided with a coil filament substantially parallel to the axis of said container, a convex cylindrical lens having its axis substantially parallel to said filament and located at its focal length from the said filament for rendering the beam of light substantially parallel in the plane perpendicular to the axes of said container and said filament, a cylindrical lens located in said beam of light and having its axis in a plane perpendicular to the axis of the first lens and adapted to render the beam of light substantially parallel in a plane parallel to the axis of the container when entering the container and further lens means between the last said cylindrical lens and the interior of said container for focusing the beam of light in the form of at least one narrow line adjacent and parallel to the inner surface of said container, and photoelectric means on the side of the container opposite the last said lens for indicating variations in the illumination passing therethrough.

4. Apparatus of the class described comprising means for holding a container in a predetermined position, a lamp provided with a coil filament substantially parallel to the axis of said container, a convex cylindrical lens having its axis substantially parallel to said filament and located at its focal length from the said filament for rendering the beam of light substantially parallel in the plane perpendicular to the axes of said container and said filament, a cylindrical lens located in said beam of light and having its axis in a plane perpendicular to the axis of the first lens and adapted to render the beam of light substantially parallel in a plane parallel to the axis of the container when entering the container and further lens means between the last said cylindrical lens and said container for focusing the beam of light in the form of at least one narrow line adjacent the inner surface of said container and photoelectric means on the side of the container opposite the last said lens for indicating variations in the illumination passing therethrough.

5. Apparatus for examining the rotating contents of a transparent fluted container including a linear light source means for focusing at least one narrow line of light therefrom adjacent the inner surface of the container, the said means including at least one lens of such focal length as to cooperate with the flutings in forming the said line, a second similar optical system comprising a similar light source and similar lenses for additionally illuminating the lower portion of said container, and photoelectric means in the emergent beam of light from both of said systems for indicating the variations in the light passing through the container.

6. In combination with means for causing the contents of a transparent container to rotate while the said container is maintained stationary, a linear light source means for focusing a narrow line of light therefrom adjacent the inner surface of the container and light-responsive means located to receive the light beam emerging from said narrow line for detecting foreign materials in the said container, and a second similar optical system comprising a similar light source and similar lenses for additionally illuminating the lower portion of said container and directing a light beam to said light responsive means.

7. Apparatus for examining the rotating contents of a transparent container which is substantially a figure of revolution comprising a light source having a filament with its axis parallel to the intended position of the axis of said figure of revolution, means for directing light in the form of a substantially parallel beam to the said container, means for focusing said beam of light in the form of a narrow line adjacent the inner surface of said container and light-sensitive means located to pick up the light beam emerging from said container, and a second similar optical system comprising a similar light source and similar lenses for additionally illuminating the lower portion of said container and directing a light beam to said light responsive means.

LAWRENCE T. SACHTLEBEN.